Sept. 8, 1953
A. H. DICKINSON
2,651,204
AUTOMATIC PRESSURE MEASURING AND INDICATING SYSTEM
Filed March 9, 1950
5 Sheets-Sheet 1
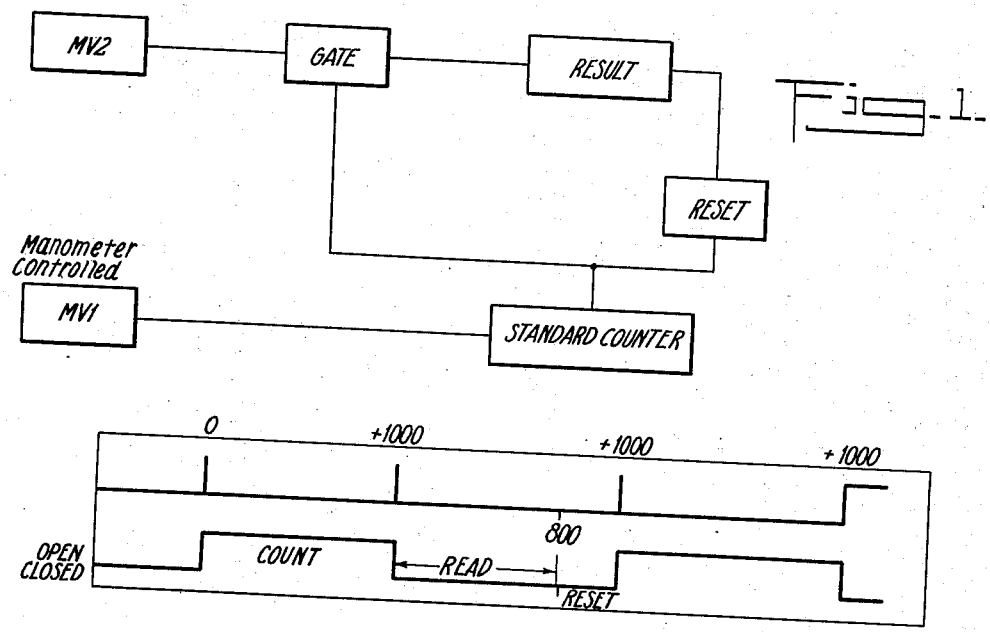
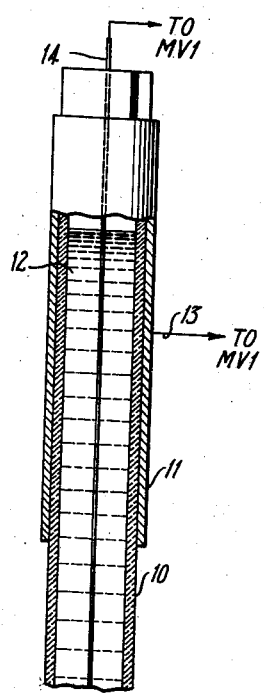
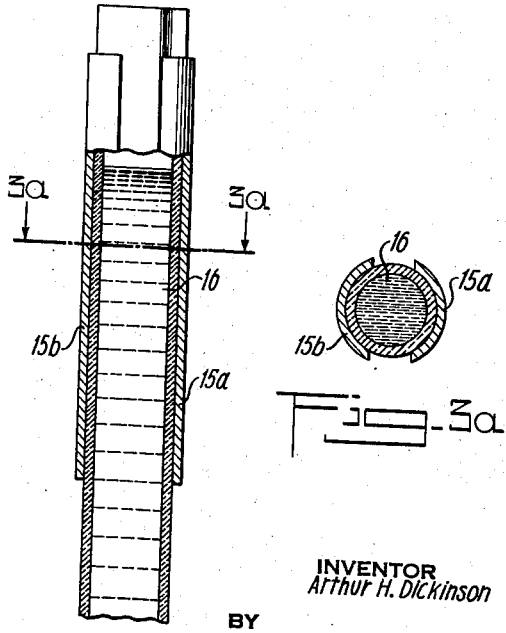
INVENTOR
Arthur H. Dickinson
BY
Charles E. McTiernan
ATTORNEY Sept. 8, 1953

A. H. DICKINSON 2,651,204

AUTOMATIC PRESSURE MEASURING AND INDICATING SYSTEM

Filed March 9, 1950

INVENTOR
Arthur H. Dickinson

BY
Charles E. McTiernan
ATTORNEY

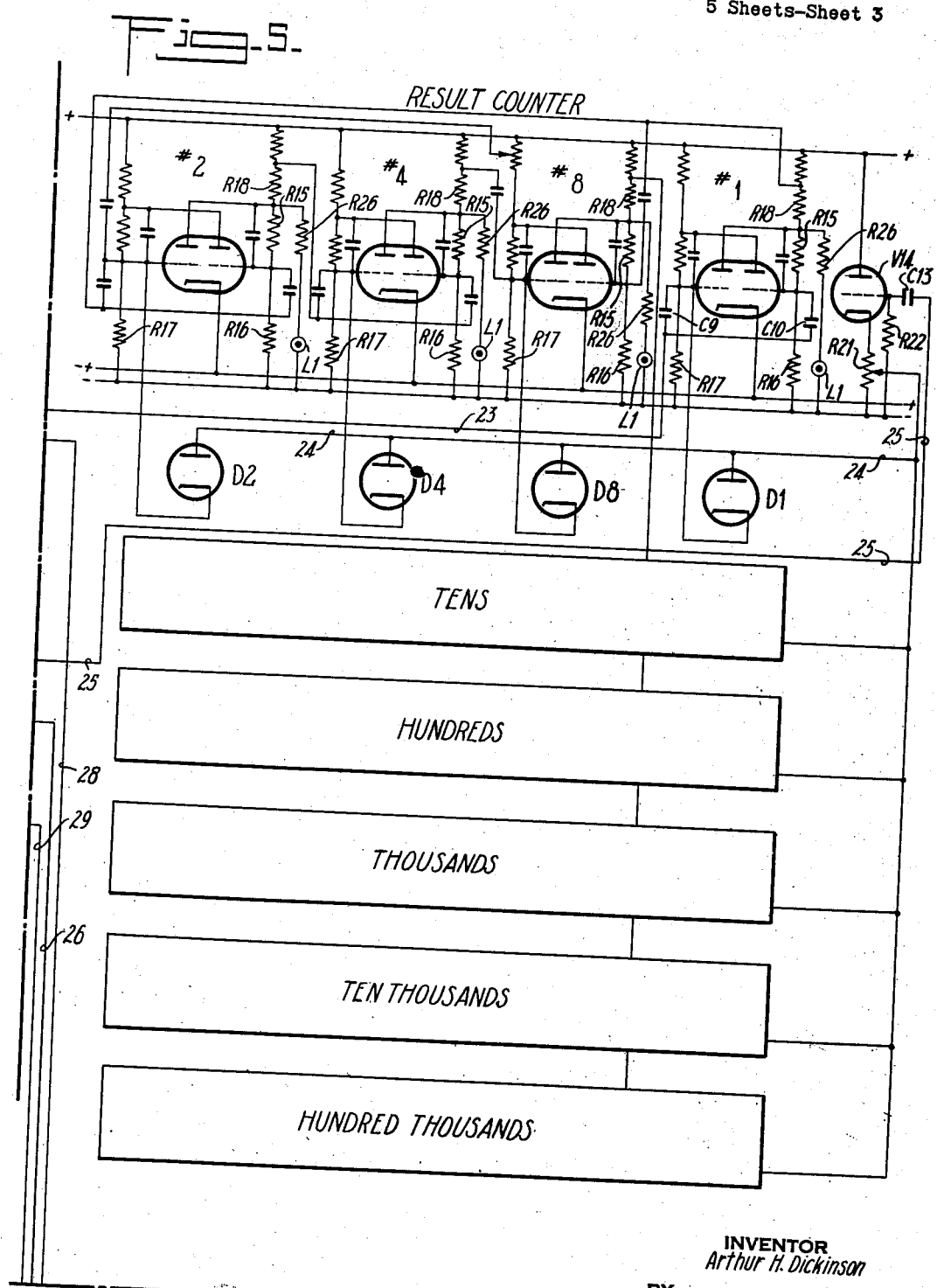

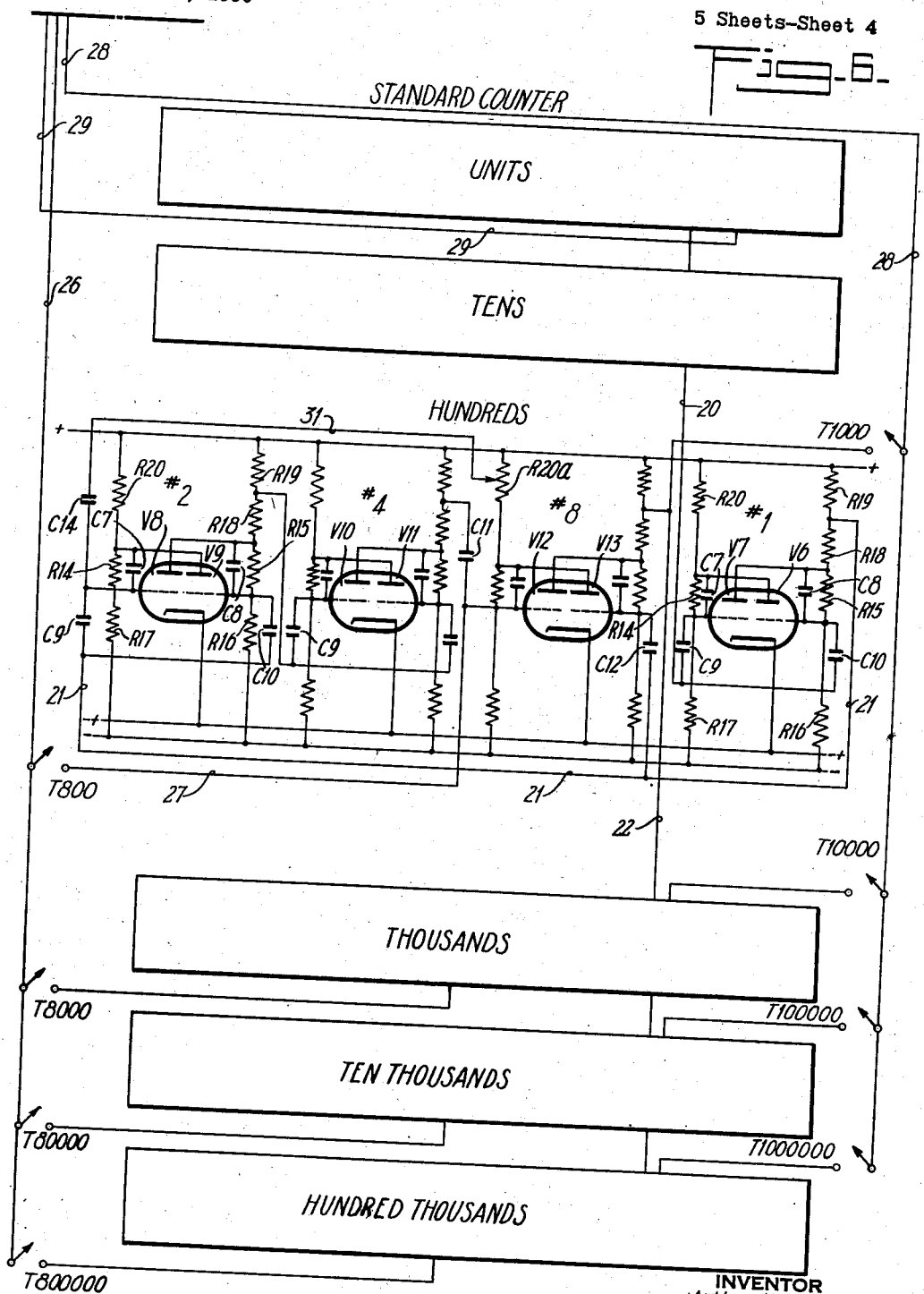

Sept. 8, 1953 A. H. DICKINSON 2,651,204
AUTOMATIC PRESSURE MEASURING AND INDICATING SYSTEM
Filed March 9, 1950 5 Sheets-Sheet 5
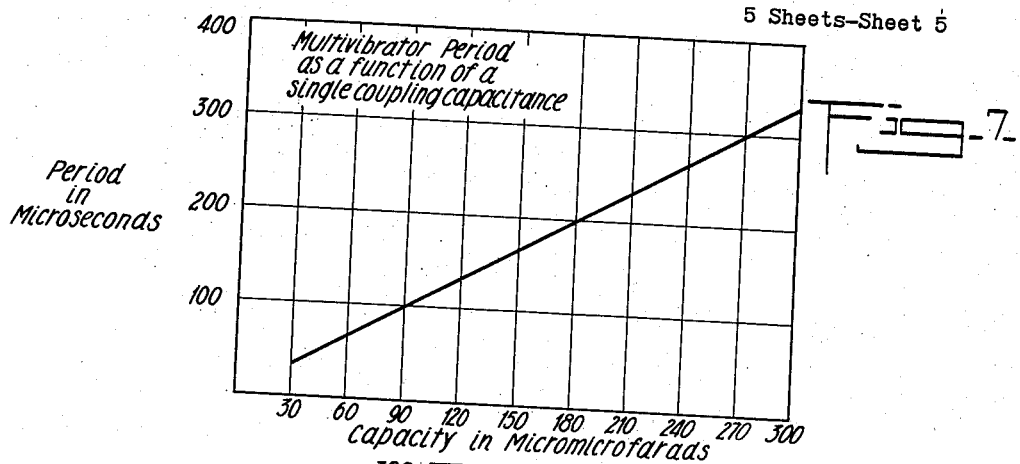
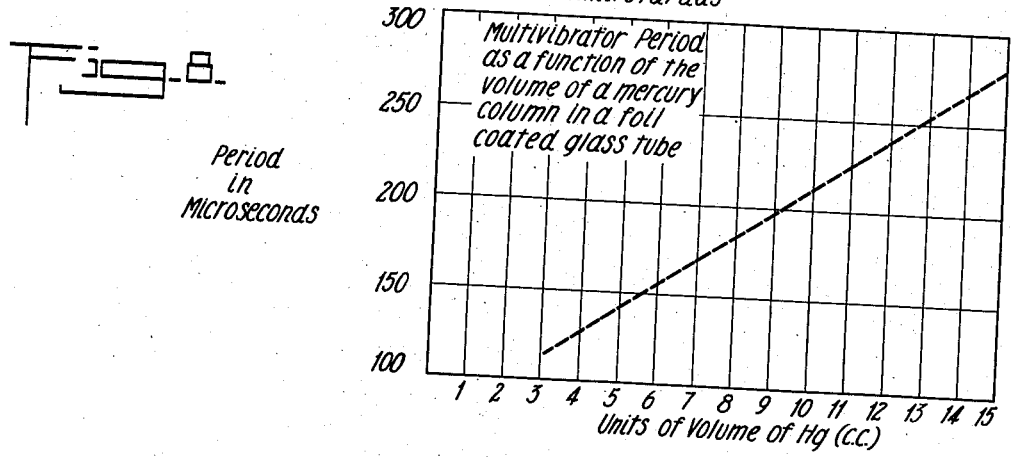
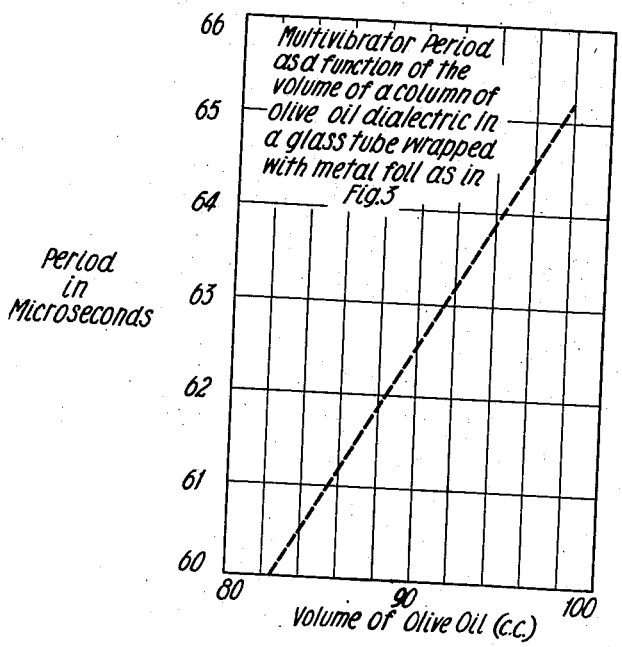
INVENTOR
Arthur H. Dickinson
BY
Charles C. McTiernan
ATTORNEY Patented Sept. 8, 1953

2,651,204

UNITED STATES PATENT OFFICE 2,651,204

AUTOMATIC PRESSURE MEASURING AND INDICATING SYSTEM

Arthur H. Dickinson, Greenwich, Conn., assignor to International Business Machines Corporation, New York, N. Y., a corporation of New York Application March 9, 1950, Serial No. 148,543

1 Claim. (Cl. 73—398)

This invention relates generally to an electronic pressure digital value indicating system.

The principal object of the invention is to provide an automatic electronic pressure digital value indicating system.

Another object of the invention is to provide an automatic pressure indicating system which registers a digital value of pressure in an electronic counter in a first period and indicates said pressure and further resets said contour in a second period.

Other objects of the invention will be pointed out in the following description and claim and illustrated in the accompanying drawings, which disclose, by way of examples, the principle of the invention and the best mode, which has been contemplated, of applying that principle.

In the drawings:

Fig. 1 is a schematic diagram of the complete system of the invention.

Fig. 2 is a partial sectional view of a manometer which is modified to convert a change in pressure to a change in capacitance.

Fig. 3 is a modification of the manometer of Fig. 2.

Fig. 3a is a cross-section taken along the line 3a—3a of Fig. 3.

Figure 4:
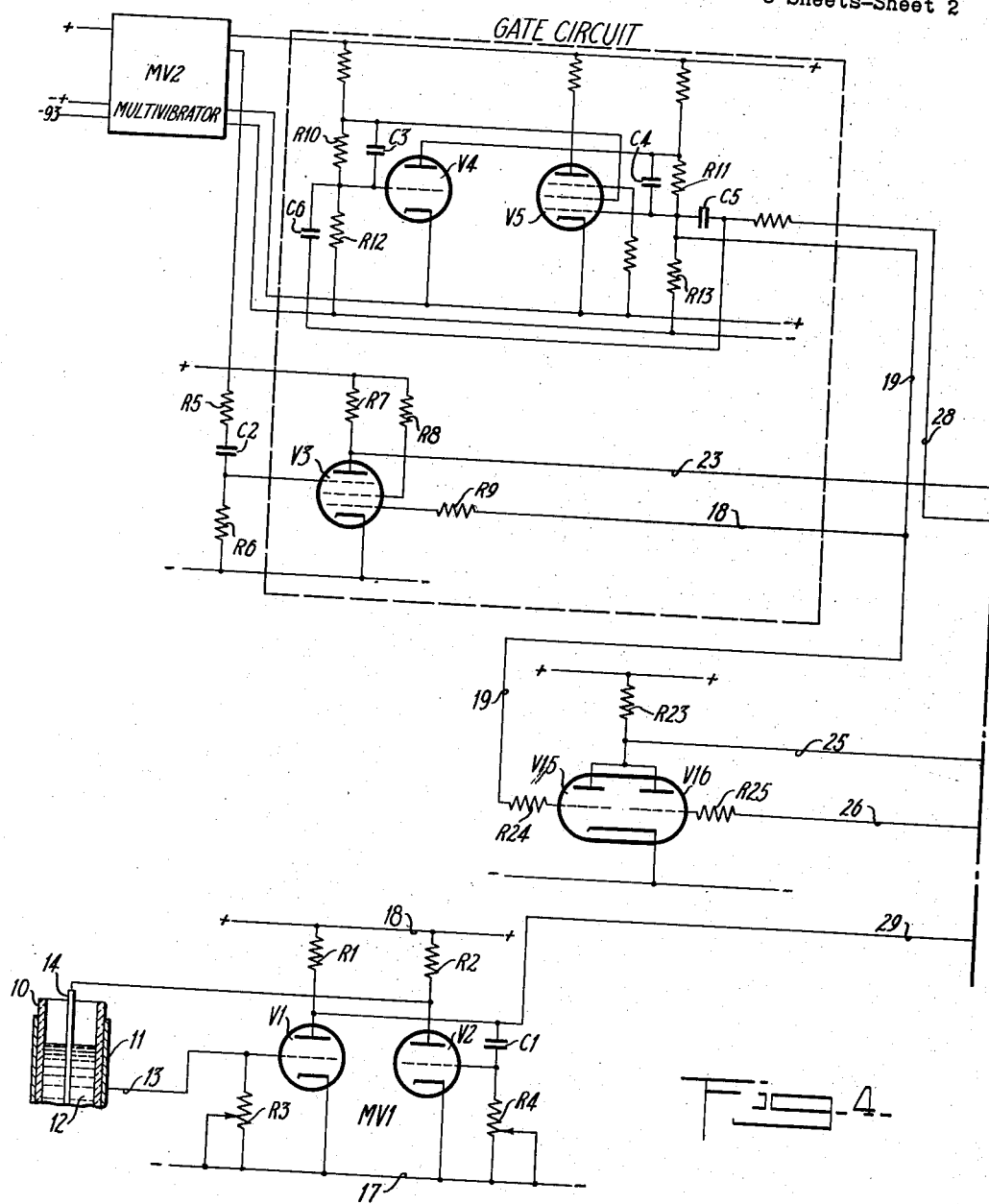

Figs. 4, 5 and 6 taken together represent the circuit diagram of the system in detail.

Fig. 7 is a graph showing the relationship between the period of a multivibrator measured in microseconds and the capacitance of one of the coupling capacitors measured in micromicrofarads.

Fig. 8 is a graph showing the relationship between the period of a multivibrator measured in microseconds and the volume in cubic centimeters of a column of mercury in the manometer of Fig. 2.

Fig. 9 is a graph showing the relationship between the period of a multivibrator measured in microseconds and the volume in cubic centimeters of a column of the olive oil dielectric in the manometer of Fig. 3.

Fig. 10 is a timing diagram of the system.

A general description will first be given of the various units which are combined, as shown in Fig. 1, to form the system. A manometer tube, which measures pressure in terms of the volume and thus of the height of a medium movable within the tube, is modified to function as a capacitor whose capacitance varies linearly with the height of the movable medium within the tube which in turn varies with pressure. This capacitance change is introduced into an oscillator circuit, such as a multivibrator MVI, thereby producing a linear change in the period of said multivibrator. The output from the multivibrator MVI is continuously applied to a standard electronic counter which in turn periodically unblocks (opens) and blocks (closes) a gate interposed between a second multivibrator MV2 having a fixed frequency output and a second electronic counter which shall be referred to as a result counter since it indicates the final results obtained. During the predetermined count that the gate is opened, pulses are applied from the multivibrator MV2 to the result counter. After the gate is closed the result counter manifests, in digital form, the pressure measured. The value appearing in the result counter remains therein for a substantial portion of a second count, which is equal to said first predetermined count, whereupon the counter is automatically reset to its original condition and is now ready to indicate another pressure.

Referring to Fig. 2 there is illustrated the details of a pressure actuated variable capacitor comprising a glass manometer tube 10 having an outer metallic coating of foil 11 and filled with a movable column of mercury 12. The metallic coating and the mercury each acts as a plate of the capacitor. This capacitor is coupled to a multivibrator circuit as in Fig. 4, to be described in detail subsequently, through a lead 13 connected to the metallic foil and a lead 14 concentric with the glass tube and immersed in the column of mercury. The capacitance of the manometer is varied by raising or lowering the column of mercury within the tube in response to a changing pressure whereby the change in capacitance is proportional to the change in the height of the mercury column.

A modification of this manometer is shown in Fig. 3. In this modification the metallic foil which is wrapped around the glass tube is divided into two segments 15a and 15b (Fig. 3a) which segments form the plates of the capacitor while the capacitance is again varied by a change in the height of a dielectric 16, which may be, for example, a column of olive oil or water whose height is varied by change in pressure.

The circuit arrangement for the complete system in which a manometer of the type as described in Fig. 2, for example, is a component part is shown in detail in Figs. 4, 5 and 6.

The manometer capacitor (Fig. 4) comprises the coupling condenser between the plate of a triode V2 which may be a 6SN7 and the control grid of a triode V1 which may also be a 6SN7.

The plate of V1 is coupled to the control grid of V2 through a fixed capacitor C1 of 120 micro-microfarad, for example. The cathode of each of the tubes V1 and V2 is connected to the negative side of the main source of power line 17, while the anodes of each of the triodes V1 and V2 are respectively connected through the resistors R1 and R2 each of 0.0027 megohm, for example, to the line 18, the main positive source of potential of approximately 105 volts. The grid resistors R3 and R4 each of 0.5 megohm are connected between the respective grids of the 6SN7 triodes V1 and V2 and the line 17. With the capacitance of C1 remaining constant, as the height of the mercury column and thus the capacitance of the manometer capacitor varies in proportion to the pressure, the period of the multivibrator varies linearly in accordance with the change in coupling capacitance as shown in Fig. 7.

The multivibrator MV2 (Figs. 1 and 4) is of a well known type having a fixed frequency output, which is continuously applied to the suppressor grid of a normally blocked pentode V3 of the gate circuit through the resistor R5, capacitor C2 and resistor R6. The anode and screen grid of V3 are connected to the high side of the main power supply through the respective resistors R7 and R8, its control grid is coupled through the resistor R9 to the gate trigger circuit via lines 18 and 19, while its cathode is connected to the low side of the main power supply.

The trigger of the gate circuit comprises a cross-coupled triode V4 and pentode V5. The screen grid of pentode V5 is coupled to the grid of triode V4 through an impedance network comprising a capacitor C3 and a resistor R10 while the anode of V4 is coupled to the grid of V5 through an impedance network comprising a capacitor C4 and resistor R11. The control grids of each of the tubes V4 and V5 are connected respectively through resistors R12 and R13 to the negative bias power supply while each of the cathodes of V4 and V5 is connected to the low side of the main power supply. The junction of the resistors R11 and R13 is coupled through capacitors C5 and C6 to the junction of the resistors R10 and R12. The trigger has two stable conditions in one of which triode V4 is conducting and pentode V5 is non-conducting while in the second condition pentode V5 conducts and triode V4 is non-conducting. In the normal stable condition of the trigger, V4 is conducting, and this is called the "off" or blocking condition.

Thus it is to be noted that in the operation of the gate circuit when the trigger is "off" (V4 conducting and V5 non-conducting), the grid bias of pentode V3 is sufficiently negative to render V3 non-conductive thus blocking the output of the fixed frequency multivibrator MV2 from being applied to the result counter (Fig. 1). When the trigger is "on" (V4 non-conducting), the grid bias of V3 is zero thereby unblocking this tube so that the output from the multivibrator MV2 is applied to the result counter. The operation of the gate trigger is determined by a standard electronic counter which will now be described.

The varying output from the manometer controlled multivibrator MV1 is continuously applied by means of a conductor 29 (Figs. 4, 5 and 6) to the units order of a standard counter which counts the pulses from MV1. This standard electronic counter, as shown in Fig. 6, comprises six orders, namely, units, tens, hundreds, thousands, ten thousands and hundred thousands orders, respectively. Each order (see Hundreds, Fig. 6) comprises four trigger circuits all similar. As shown, the hundreds order comprises four trigger stages #1, #2, #4 and #8 labeled according to the binary notation, the number assigned to a particular stage representing the number of pulses necessary to shift that particular stage.

The #1 trigger stage comprises a pair of triodes V6 and V7 shown as having a common cathode connected to ground. The anode of V6 is coupled to the control grid of V7 through an impedance network comprising a resistor R14 and a capacitor C7 while the anode of V7 is coupled to the control grid of V6 through an impedance network comprising a resistor R15 and a capacitor C8. The resistors R16 and R17 are connected between the respective grids of the triodes V6 and V7 and the bias supply. Anode resistors R18 and R19 of V7 and the single anode resistor R20 of V6 are connected between the positive side of the power supply and the respective impedance network associated therewith, while the control grids of the triodes are coupled together through capacitors C9 and C10. The output from the #8 stage of the tens order is applied by means of a line 20 to the #1 trigger of this hundreds order through the capacitors C9 and C10. The output of the #1 trigger of the hundreds order is coupled to the #2 trigger of the same order (shown at the extreme left in Fig. 6) by means of a line 21 extending from the junction of resistors R18 and R19 of tube V7 of the #1 trigger to the capacitors C9 and C10 of the #2 trigger. The #2 trigger which is identical in design with the #1 trigger is coupled to the #4 trigger through the respective capacitors C9 and C10 to the #4 stage. The output of the #4 stage is applied to one side only of the #8 stage through a capacitor C11 while the output of the #8 stage is applied to the #1 stage, of the next higher (thousands) order, by means of a line 22.

For the first nine pulses applied to the hundreds order, the triggers operate in straight binary. On the tenth pulse, however, there is an automatic forced resetting of the trigger circuits to an original or zero condition due to the coupling of the plate circuit of V7 of the #1 trigger via line 21 and capacitor C12 to the grid of V13 of the #8 trigger and via the circuit from resistor R20a of the #8 trigger via line 31 and capacitor C14 to the grid of triode V8 of the #2 trigger, which returns the complete order to the original zero condition in a well known manner thereby converting operation of the counters from a binary to a tens notational basis.

A reset control switch T800 is inserted between line 26 leading from the control grid of V16 (Fig. 4) and line 27 connected to the input to the #8 stage of the hundreds order (Fig. 6) while a switch T1000 is inserted between line 28 leading from the control grid of pentode V5 of Fig. 4 and the output of the #8 stage (Fig. 6) of the hundreds order. These switches T1000 and T800 when in a closed position determine, respectively, the time of a complete cycle and the time of resetting during alternate cycles. If it is desired to increase the extent of a complete cycle then any one of the switches T10,000 to T1,000,000 may be used along with the respective resetting switches T8000 to T800,000.

The result counter shown in Fig. 5 with the units order completely illustrated is generally like the standard counter but is employed to count the pulses produced on the resistor R7 of pentode V3 (Fig. 4) which pulses are applied to the #1 trigger of the units order via conductor 23 (Figs. 4 and 5). Additional elements employed in the result counter circuit which are not found in the standard counter are diodes D1, D2, D4 and D8 which enable the result counter to be reset to an original indicating condition, as will be described presently. The anode of each diode is connected to a line 24 which is adjustably coupled to the resistor R21, the cathode follower resistor for triode V14, whose anode is connected to the high side of the main power supply. The control grid of V14 is connected to one end of the resistor R22 whose other end is connected to the bias supply while the cathode of V14 is connected to the low side of the power supply through said resistor R21 whereby the flow through triode V14 is maintained normally low so that the anodes of all of the diodes D1, D2, D4 and D8 are normally negative with respect to the cathodes thereof, regardless of the "on" and "off" status of the associated trigger. The cathodes of each of the diodes is connected to the control grid of the left hand tube of its associated trigger.

The grid of triode V14 is coupled through the capacitor C13 and line 25 (Figs. 5 and 4) to the common plate connection of triodes V15 and V16. The anodes of V15 and V16 are also commonly connected through a resistor R23 to the high side of the main power supply while the common cathode is connected to the low side. The control grid of V15 is connected through a resistor R24 and line 19 to the junction of resistors R11 and R13 of the gate trigger while the control grid of V16 is connected via resistor R25 and line 26, as described above, to the normally open switches T800 to T800,000 (Fig. 6) which are in turn connected to the input of the #8 trigger of the respective order of the standard counter associated therewith.

For the purpose of indicating the condition of each stage of the result counter, a resistor R26 (Fig. 5) and neon lights L1 are connected between the junction of resistors R15 and R18 and the bias supply. When the trigger is "on" the voltage drop across the resistors R15 and R16 is sufficient to cause L1 to ignite. When the trigger is "off" the neon light L1 remains extinguished. Thus the neon lights L1 manifest the "on" and "off" pattern of the trigger circuits thereby permitting visual reading of a count.

In the actual operation of the result counter, the four trigger stages of each order are considered to be "off" when in a zeroized status, i. e. the left hand triode of each stage is conducting and the right hand is non-conducting. Thus, the trigger stages of the counter are considered to be "on" when the right hand triode is conducting.

The operation whereby the indicating system is automatically and sequentially rendered effective for the purposes of initiating a measuring cycle and then resetting the counter to an original indicating position will now be described.

As pointed out above, as the height of the column of mercury in the manometer capacitor (Fig. 2) varies with the pressure, the capacitance of the capacitor varies linearly with the change in the height of the mercury. Since the manometer capacitor comprises one of the coupling capacitors of the multivibrator MV1 (Fig. 4) the period of the multivibrator is made to vary linearly with respect to said change in capacitance (Fig. 7) and similarly there exists a linear relationship between the period of the multivibrator and the height of the mercury column and thus also, the pressure.

The variable output from the multivibrator MV1 is applied via line 29 (Figs. 4, 5 and 6) to the #1 trigger of the units order of the standard counter in which the pulses are counted. As the count in the standard counter progresses from -0- to -799-, the #8 trigger (Fig. 6) in the hundreds order is "off," and with switch T800 closed renders the tube V16 (Fig. 4) highly conductive while the tube V15 (Fig. 4) which is coupled to the junction of the resistors R11 and R13 by line 19, is biased beyond cut off, since the gate trigger circuit is "off." As the count in the standard counter passes from -799- to -800-, the #8 trigger of the hundreds order is turned "on" with triode V13 conducting so that via line 27, switch T800 and line 26 (Figs. 6, 5 and 4) V16 is made nonconductive. As soon as V16 is thus rendered nonconductive, a positive pulse is produced on R23 which is applied via line 25 (Figs. 4 and 5) to the grid of triode V14 rendering it more conducting. As V14 is made more conducting, the anode potential of each of the diodes D1, D2, D4 and D8 of the result counter is increased at least to the cathode potential of the associated trigger circuit thus initially resetting the result counter to zero.

After the result counter is thus reset, the pulses from the manometer controlled multivibrator MV1 continue to enter the standard counter and when the count passes from -999- to -1000-, a negative pulse is applied to the control grid of triode V4 of the gate trigger by means of the now closed switch T1000 (Fig. 6) and the line 28 (Figs. 6, 5 and 4) to condenser C6 whereby the gate trigger is turned "on" thus initiating a measuring cycle, as shown at "0" time on the timing diagram of Fig. 10. When the gate trigger is thus turned "on," the gate pentode V3 (Fig. 4) is unblocked so that the output from the fixed frequency multivibrator MV2 is applied via line 23 to the #1 trigger of the result counter (Fig. 5). During the next count of -1000- pulses by the standard counter, the result counter counts the output from this multivibrator MV2. After this second count of -1000- has been counted by the standard counter, a negative pulse is applied, as described above, from its hundreds order through the now closed switch T1000 and the line 28 (Figs. 6, 5 and 4) to both sides of the gate trigger through the capacitors C5 and C6 flipping it "off." Thus the gate trigger is flipped alternately "on" and "off" after each successive count of -1000- by the standard counter. After the measuring cycle is terminated, at the end of this second count of -1000-, the digital indication appearing in the result counter is a digital value indication of the period of the multivibrator MV1 which, in turn is a linear function of the height of the mercury column and thus of the pressure, all as detected by the manometer capacitor. After a "read" count of -800-, as shown in Fig. 10, the result counter is again reset to prepare for the indication of another pressure measurement. Thus it is to be noted that each measuring cycle count is followed by an equal count which is employed for the dual purpose of manifesting the results, for approximately .8 of this count, and resetting the result counter during the remainder of this count (Fig. 10).

During a measuring cycle there is no unwanted resetting of the result counter when the #8 trigger of the hundreds order of the standard counter is turned "on." This is due to the fact that when the gate trigger is "on," the grid of V15 is maintained at zero bias thus producing a very substantial drop across R23. Thus when the #8 trigger of the hundreds order of the standard counter is turned "on," during a measuring cycle, the voltage drop across the resistor R23 is not reduced to a magnitude sufficient to cause an unwanted resetting.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited onlly as indicated by the scope of the following claim.

What is claimed is:

In an automatic pressure measuring and indicating system comprising a pressure responsive variable capacitor, said capacitor comprising a glass tube manometer which further comprises a cylindrical glass member having a metallic coating on the outer side thereof, a column of mercury contained within said member, said metallic coating and said column of mercury each forming a plate of said capacitor, the capacitance of said capacitor varying with a change in height of said mercury which varies linearly with pressure, a first multivibrator circuit, means connecting said capacitor in said circuit whereby the period of said circuit varies linearly with respect to said pressure, a first electronic counter coupled to said circuit, a second multivibrator circuit having a fixed frequency output, a second electronic counter, blocking means preventing the output of said second circuit from being applied to said second counter, said first counter being coupled to said blocking means, the output of said first circuit being continuously applied to said first counter whereby said first counter cyclically and automatically unblocks and blocks said blocking means at equal counts, said second counter having entered therein the output from said second multivibrator whenever said blocking means becomes unblocked, said second counter manifesting said pressure by a digital representation, means automatically resetting said second counter after said manifesting, and means to prevent the unwanted resetting of said second counter during the count when said second circuit is unblocked.

ARTHUR H. DICKINSON.

References Cited in the file of this patent

UNITED STATES PATENTS

| Number | Name | Date |
|---|---|---|
| 1,939,067 | Legg | Dec. 12, 1933 |
| 2,496,338 | Barton | Feb. 7, 1950 |
| 2,498,908 | Baldinger | Feb. 28, 1950 |
| 2,519,184 | Grosdoff | Aug. 15, 1950 |
| 2,519,421 | Weiss | Aug. 22, 1950 |
| 2,525,020 | De Jarlais | Oct. 10, 1950 |

FOREIGN PATENTS

| Number | Country | Date |
|---|---|---|
| 574,873 | Germany | Apr. 21, 1933 |

OTHER REFERENCES

German Publication, "Zeitschrift fur Electrochemie," vol. 35, No. 4, 1929, Article by Simon et al., pages 162–164.